UNITED STATES PATENT OFFICE.

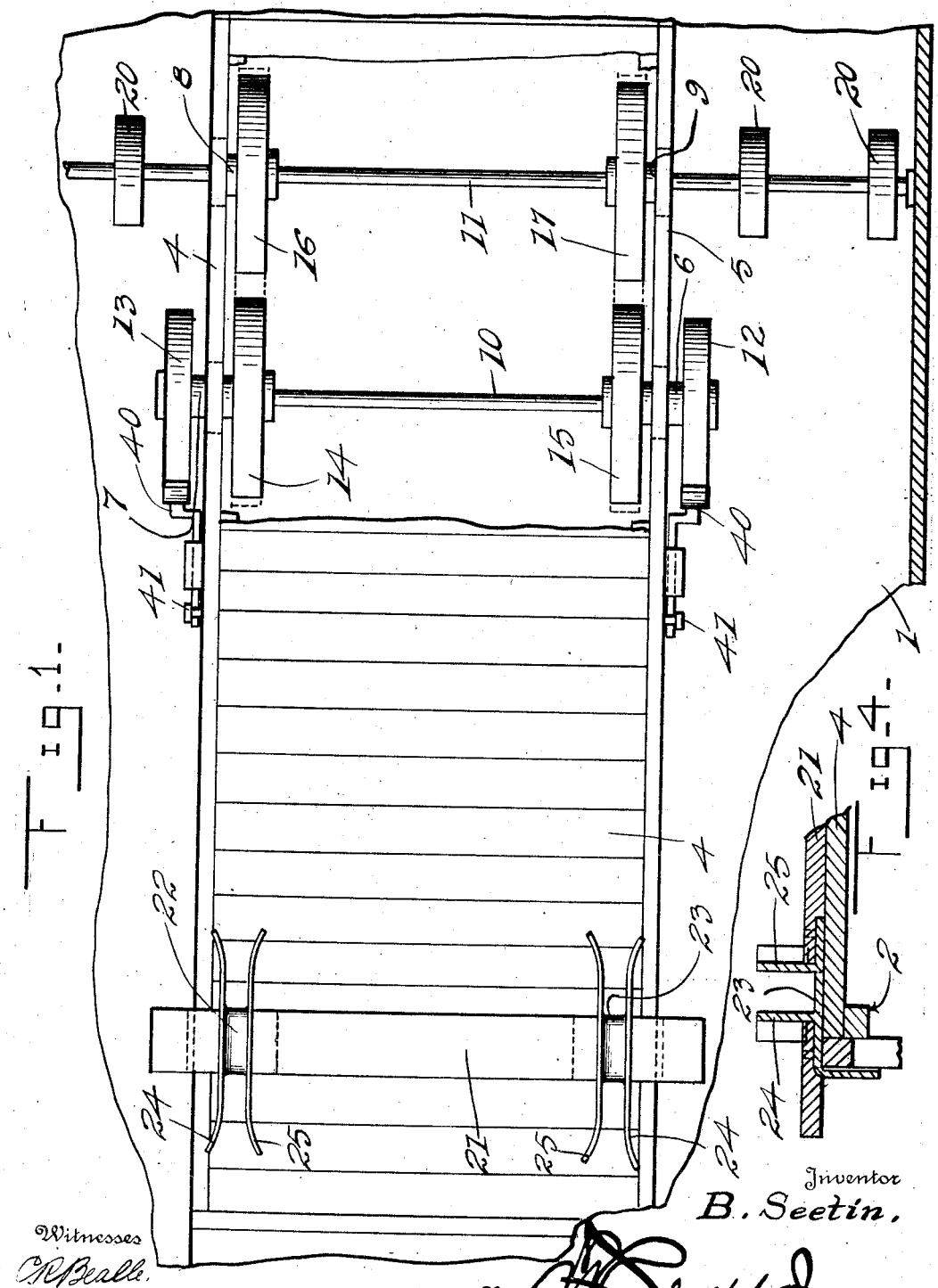

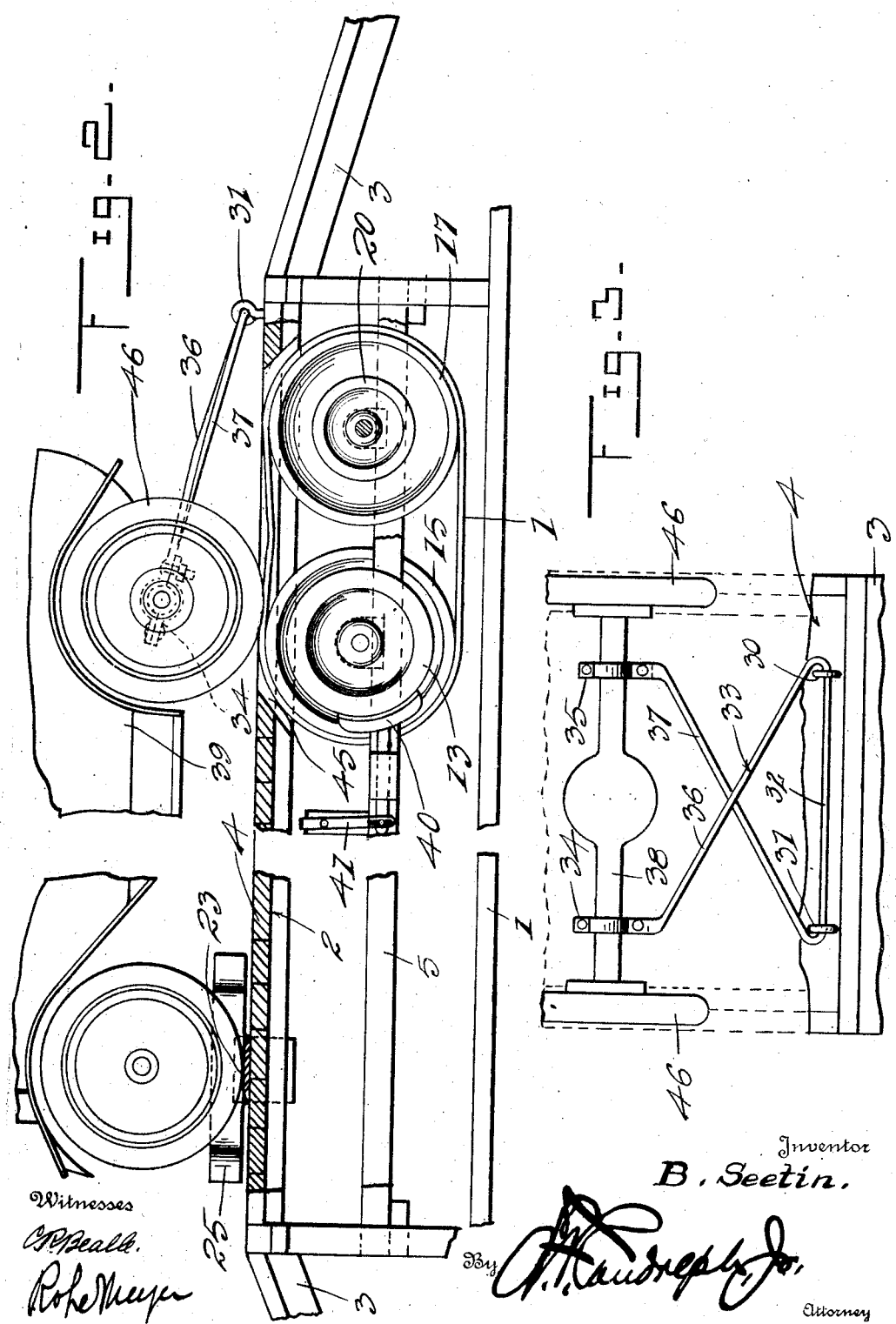

BUSWELL SEETIN, OF SWEET, IDAHO.

TREADMILL.

1,206,604.

Specification of Letters Patent.

Patented Nov. 28, 1916.

Application filed February 16, 1915. Serial No. 8,608.

*To all whom it may concern:*

Be it known that I, BUSWELL SEETIN, a citizen of the United States, residing at Sweet, in the county of Boise and State of Idaho, have invented certain new and useful Improvements in Treadmills; and I do hereby declare the following to be a full, clear, and exact description of the invention, such as will enable others skilled in the art to which it appertains to make and use the same.

This invention relates to tread mills and the primary object of the invention is to provide a tread mill for operation by an automobile, for transmitting power from the automobile to various types of mechanism, for utilizing the automobile as a prime mover.

Another object of this invention is to provide a tread mill as specified, which embodies a pair of transversely supported shafts, upon which are mounted suitable pulleys, and to connect the corresponding pairs of pulleys upon the shafts, with belts for transmitting the power from one shaft to the other.

Another object of this invention is to provide a novel form of sockets for retaining the front wheels of the automobile when used for operating the tread mill, and also to provide a novel form of bracket for engaging the rear axle of the automobile for holding the vehicle stationary while upon the tread mill.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a plan view of the improved tread mill showing parts thereof broken away, Fig. 2 is a longitudinal sectional view through the tread mill, showing a motor vehicle mounted thereupon, Fig. 3 is a plan view of the means for holding the motor vehicle against movement, when upon the tread mill, and Fig. 4 is a detail cross sectional view through one of the front wheel sockets.

Referring more particularly to the drawings, 1 designates the supporting base of the tread mill, which has a rectangular structure 2 secured thereto and extending upwardly therefrom. The rectangular structure 2 has inclined approaches 3 communicating with each end thereof, to facilitate the passage of an automobile or motor vehicle upon the upper surface or platform 4 of the same. The rectangular structure 2 has side rails 5 secured to the opposite sides thereof and extending longitudinally along the same. The side rails 5 have seated therein bearings 6, 7, 8 and 9. The bearings 6 and 7 have a shaft 10 rotatably journaled therein, which shaft extends transversely of the rails 5. The bearings 8 and 9 have a shaft 11 rotatably journaled therein, which shaft projects upon the opposite sides of the rectangular structure 2.

The shaft 10 has balance wheels 12 and 13, mounted upon its opposite ends exteriorly of the side rails 5, and pulleys 14 and 15 mounted thereon, intermediate of the rails 5, and positioned in close proximity to the rails. The pulleys 14 and 15 aline with pulleys 16 and 17 which are carried by the shaft 11. Belts 18 pass about the pulleys 14 and 16, and about the pulleys 15 and 17, as is clearly shown in Fig. 2 of the drawings. The shaft 11 has power transmission pulleys 20 mounted thereon, for transmitting the power from the shaft 11 to any desired type of device. The platform 4 of the rectangular structure 2, has a plate 21 positioned upon its upper surface, and extending transversely across the same, which plate slidably carries sockets 22 and 23. The sockets 22 and 23 are positioned for receiving the front wheels of a motor vehicle, when the same is mounted upon the tread mill. The sockets 22 and 23 have resilient spaced arms 24 and 25, for engaging the opposite sides of the tires of the front wheels of the motor vehicle, thus preventing movement of the wheels. The ends of the side rails 24 and 25 are curved outwardly, to facilitate the insertion of the wheels therebetween. The rear end of the platform 4 has eye-bolts 30 and 31 secured thereto, to the eyes of which bolts are connected the straight sections 32 of the cross rods 33. The ends of the rods 33 are bent at right angles to the straight portions 32 and they cross each other intermediate their ends as is clearly shown in Fig. 3 of the drawings. Clamping bearings 34 and 35 are formed upon the terminals of the crossed ends 36 and 37 of the rod 33, and they provide for clamping engagement with the rear axle 38 of the motor vehicle 39 for holding the motor vehicle stationary, while mounted upon the tread mill.

The side rails 5 have brake shoes 40 carried thereby which are provided for frictional engagement with the peripheries of the balance wheels 12 and 13 for preventing rotation of the shaft 10. Levers 41 are operatively connected to the brake shoes 40 for drawing them into or out of frictional engagement with the peripheries of the balance wheels. The platform 4 is provided with longitudinal slots 45 formed therein, directly over the pulleys 14 and 16, and 15 and 17.

When it is desired to utilize an automobile or motor vehicle, such as illustrated at 39 in Fig. 2 of the drawings, for the purpose of generating power for operating various types of mechanism, such as a churn, wood saw or the like, the motor vehicle is driven upon the platform 4, passing upwardly over one of the inclined approaches 3, until the front wheels of the same are seated within the sockets 22 and 23, at which time the rear drive wheel 46 of the vehicle will engage the belts 18 directly above the pulleys 14 and 15. The clamping bearings 34 and 35 are then securely clamped to the rear axle 38 of the motor vehicle, which prevents the vehicle from passing off the platform 4 and the power of the vehicle is started. The engagement of the rear drive wheel 46 of the motor vehicle with the belts 18, directly over the pulleys 14 and 15, will rotate the pulleys 14 and 15, the shaft 10, and the shaft 11 and the various pulleys carried thereby, through the belted connections between the shafts 10 and 11. The power is transmitted from the shaft 11, by suitable belts which are mounted upon the pulley 20 and operatively connected to the mechanical device which is to be driven by the motor vehicle. The balance wheels 13 increase the momentum of the shaft 10.

From the foregoing description taken in connection with the accompanying drawings the advantages of construction and of the method of operation of the improved tread mill will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

In a tread mill, a substantially rectangular structure, a platform carried by the upper ends of said structure, side rails connected at their opposite ends to opposite sides of said structure and extending longitudinally therewith, said side rails located beneath said platform, bearings seated in each of said side rails adjacent their rear ends, shafts journaled transversely across said side rails in said bearings, said platform being provided adjacent its rear end with longitudinally extending slots on opposite sides thereof, pulleys mounted upon said shafts adjacent their outer ends and located on the inner sides of said rails and in direct alinement with the slots, power of transmission pulleys mounted upon the opposite ends of one of said shafts and located on the outer side of said side rails, balance wheels on the opposite ends of the other of said shafts, means carried by said side rails and engaging said balance wheels for retarding the rotation of the same, belts trained over said pulleys, means at the forward and rear end of said platform for engaging the front and rear axle of a vehicle for holding the same positioned over the belts of the shafts and to prevent the movement of said vehicle when rotating the shafts substantially as set forth.

In testimony whereof I affix my signature in presence of two witnesses.

BUSWELL SEETIN.

Witnesses:
 OLIVER SEETIN,
 ANNIE SKIPPEN.